July 1, 1958     E. RAND     2,840,936
BRUSH RAKE ATTACHMENT FOR BULLDOZERS
Filed Aug. 24, 1955     2 Sheets-Sheet 1

Eilert Rand
INVENTOR.

July 1, 1958
E. RAND
2,840,936
BRUSH RAKE ATTACHMENT FOR BULLDOZERS
Filed Aug. 24, 1955
2 Sheets-Sheet 2
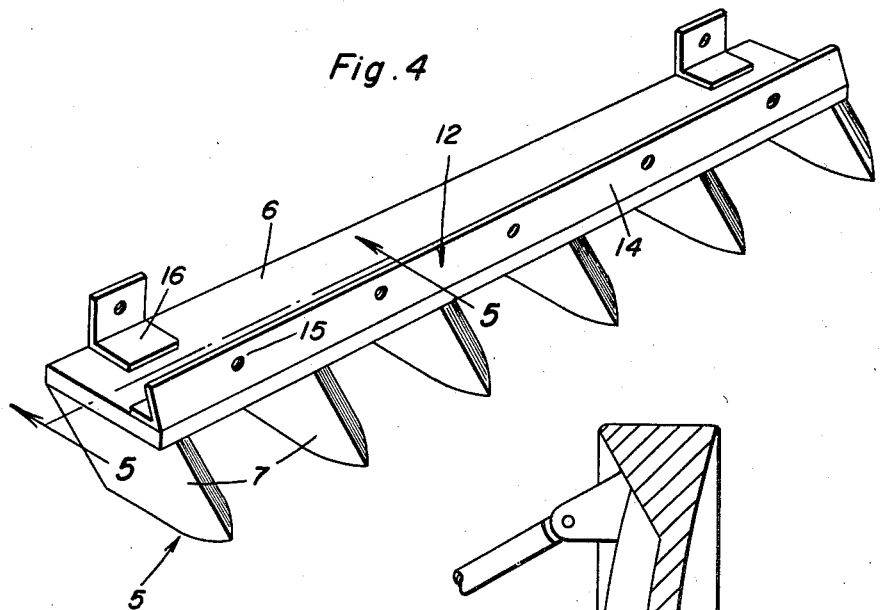
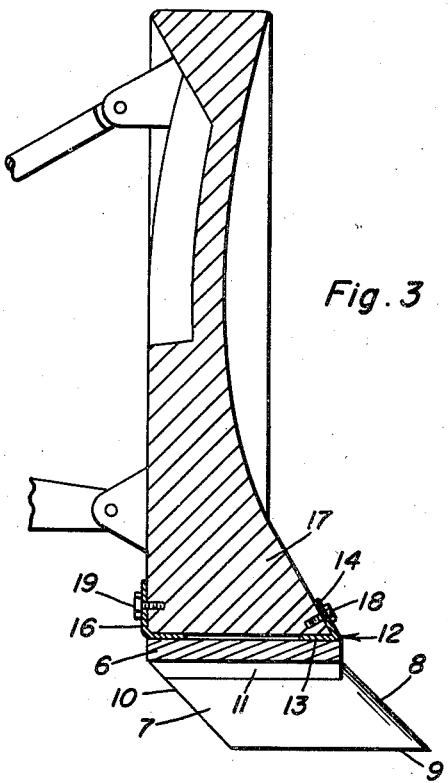
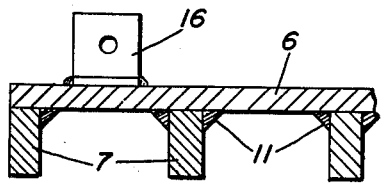
Eilert Rand
INVENTOR.

United States Patent Office 2,840,936
Patented July 1, 1958

2,840,936
BRUSH RAKE ATTACHMENT FOR BULLDOZERS

Eilert Rand, Missouri Valley, Iowa, assignor of fifty percent to Jacob Rand, Missouri Valley, Iowa Application August 24, 1955, Serial No. 530,263

1 Claim. (Cl. 37—145)

The present invention relates to new and useful improvements in earth working machinery generally, and more particularly to a tooth attachment for the blade of a bulldozer for clearing the land of brush, stones or other loose material, or for other purposes where a toothed scraper blade is needed.

An important object of the invention is to provide an easily attachable set of rake teeth for use with a bulldozer blade.

Another object is to provide an attachment of this character of simple and practical construction, which is strong and endurable, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged vertical sectional view taken on a line 3—3 of Figure 2;

Figure 4 is a perspective view of the detachable set of teeth; and

Figure 5 is a fragmentary longitudinal sectional view taken on a line 5—5 of Figure 4.

Figure 1:
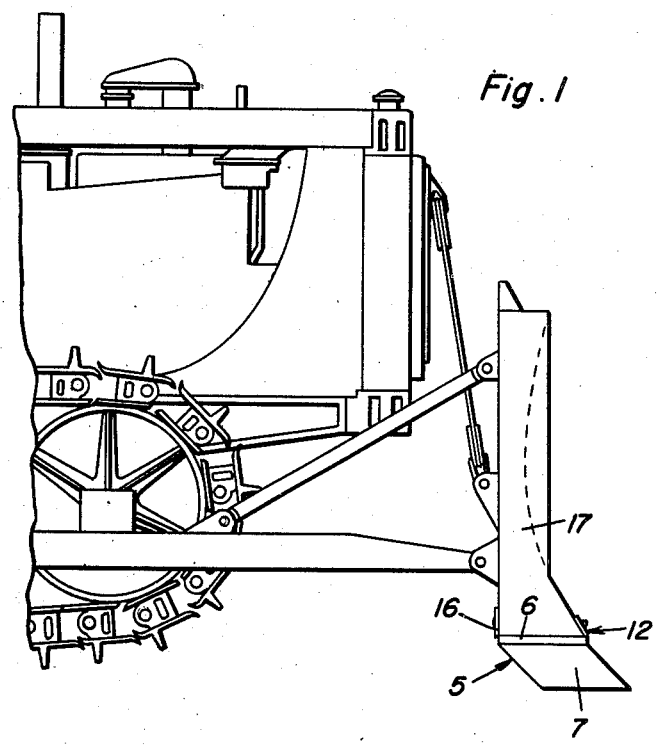
Figure 1 is a side elevational view.
Figure 2:
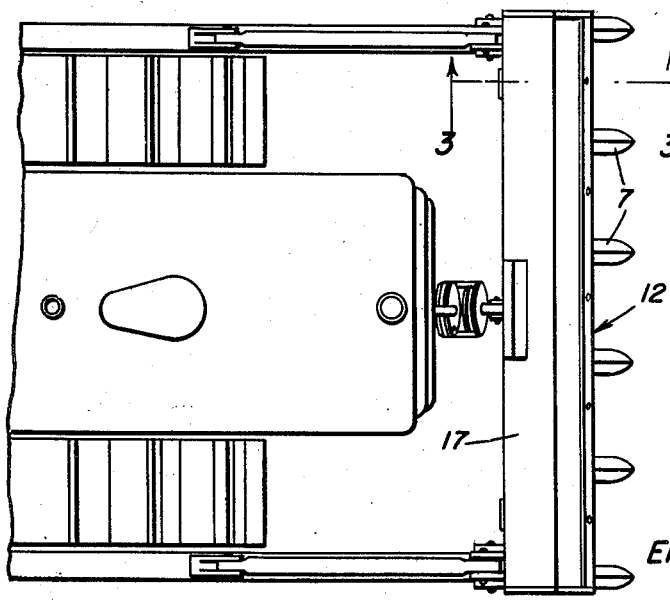
Figure 2 is a top plan view.

Referring now to the drawings in detail, wherein for the purpose of illustration, I have disclosed a preferred embodiment of invention, the numeral 5 designates the set of rake teeth generally and which comprises an elongated metal plate or beam 6 to the underside of which a plurality of teeth 7 are welded or otherwise suitably secured. The teeth 7 are formed with a forwardly sloping tapered front edge 8 to project forwardly of the front edge of the beam 6, while the lower edge 9 of the teeth are flat and positioned parallel to the beam 6. The rear edge 10 of the teeth are parallel to the front edge 8 to form the teeth in the shape of a parallelogram in elevation to slope the rear of the teeth in the plane of the front edge thereof for cleaning and scraping brush by a rearward as well as a forward movement of the bulldozer. Bracing webs 11 are welded at the junction of the sides of the teeth with the underside of the beam 6 to reinforce the teeth.

An elongated angle member 12 is constructed of a length coextensive with that of the beam 6 and includes a horizontal flange 13 which is welded on top of the beam at the front edge of the latter and an upstanding rearwardly inclined flange 14 which is formed with a row of openings 15. A plurality of angle brackets 16 are welded on top of the beam 6 at the rear edge of the latter.

The beam 6 is detachably secured to the underside of a bulldozer blade 17 by means of bolts 18 inserted in the openings 15 of the upstanding flange 14 and threaded into the lower front portion of the bulldozer blade to position the flange 14 at the lower front edge of the blade, and the brackets 16 are secured to the rear of the blade 17 by bolts 19.

With the tooth attachment 5 secured to the lower edge of the bulldozer blade 17 in the manner indicated, the teeth 7 will project downwardly at the underside of the blade to rake brush, rocks or other debris from the surface of the ground while dirt is permitted to drop between the teeth. When the rake attachment is not needed, the same may be easily and quickly detached from the bulldozer blade and the latter used in a normal manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A rake attachment for the blade of an earth working machine comprising a beam coextensive with the bottom surface of an earth working blade, a plurality of teeth extending downwardly from the beam, an elongated attaching strip fixed to one longitudinal edge of the beam and extending upwardly therefrom, a plurality of attaching brackets fixed to the other longitudinal edge of the beam, and means detachably securing the strip and brackets to the lower front and rear portions respectively of the blade to support the rake attachment under the bottom of the blade.

References Cited in the file of this patent

UNITED STATES PATENTS

| | | |
|---|---|---|
| 1,543,222 | McVeety | June 23, 1925 |
| 1,741,933 | Gunnison | Dec. 31, 1929 |
| 1,744,139 | Patton | Jan. 21, 1930 |
| 2,632,261 | Ferris | Mar. 21, 1953 |
| 2,634,520 | Foster | Apr. 14, 1953 |
| 2,763,073 | Aaron | Sept. 18, 1956 |